US010479855B2

(12) United States Patent
Masuda et al.

(10) Patent No.: US 10,479,855 B2
(45) Date of Patent: Nov. 19, 2019

(54) (METH)ACRYLIC COPOLYMER, ADHESIVE COMPOSITION AND ADHESIVE SHEET CONTAINING SAME, AND COATING MATERIAL AND COATED PRODUCT USING SAME

(71) Applicant: Mitsubishi Chemical Corporation, Chiyoda-ku (JP)

(72) Inventors: Eri Masuda, Chiyoda-ku (JP); Junichi Nakamura, Chiyoda-ku (JP); Hiroko Shinada, Chiyoda-ku (JP); Takayuki Kobayashi, Chiyoda-ku (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 56 days.

(21) Appl. No.: 15/578,780

(22) PCT Filed: Jun. 1, 2016

(86) PCT No.: PCT/JP2016/066154
§ 371 (c)(1),
(2) Date: Dec. 1, 2017

(87) PCT Pub. No.: WO2016/194937
PCT Pub. Date: Dec. 8, 2016

(65) Prior Publication Data
US 2018/0142055 A1    May 24, 2018

(30) Foreign Application Priority Data

Jun. 2, 2015 (JP) ................... 2015-111997
Nov. 9, 2015 (JP) ................... 2015-219589

(51) Int. Cl.
| | |
|---|---|
| *C09J 7/10* | (2018.01) |
| *C09J 133/04* | (2006.01) |
| *C08F 290/04* | (2006.01) |
| *C09D 151/00* | (2006.01) |
| *C09J 151/00* | (2006.01) |
| *C09D 155/00* | (2006.01) |
| *C09J 155/00* | (2006.01) |

(52) U.S. Cl.
CPC ...... *C08F 290/046* (2013.01); *C09D 151/003* (2013.01); *C09D 155/005* (2013.01); *C09J 7/10* (2018.01); *C09J 133/04* (2013.01); *C09J 151/003* (2013.01); *C09J 155/005* (2013.01); *C08F 2800/20* (2013.01); *C09J 2201/622* (2013.01); *C09J 2433/00* (2013.01)

(58) Field of Classification Search
CPC ........ C09J 7/10; C09J 133/04; C09J 155/005; C09J 151/003; C09J 2201/622; C09J 2433/00; C08F 290/046; C08F 220/18; C08F 220/06; C08F 2800/20; C09D 155/05; C09D 151/03
USPC .......................................................... 526/301
See application file for complete search history.

(56) References Cited

U.S. PATENT DOCUMENTS 3,842,146 A * 10/1974 Milkovich et al. ... C08F 290/04
525/271
2006/0052563 A1   3/2006  Nakagawa et al.
2015/0343392 A1  12/2015  Hikita et al.
2016/0185893 A1   6/2016  Oonuma et al.

FOREIGN PATENT DOCUMENTS

| | | |
|---|---|---|
| JP | 02/22755 A3 | 6/1999 |
| JP | 2007-254758 A | 10/2007 |
| JP | 2011-122113 A | 6/2011 |
| JP | 2016/066154 A | 6/2016 |
| KR | 10-0161999 B1 | 1/1999 |
| WO | WO 93/22355 A1 | 11/1993 |
| WO | 02/22755 A2 | 3/2002 |
| WO | 2014/098141 A1 | 6/2014 |
| WO | 2014/098234 A1 | 6/2014 |

OTHER PUBLICATIONS

Office Action dated Sep. 10, 2018 in Korean Patent Application No. 10-2017-7037444, (with English translation), citing document AO therein, 11 pages.
International Search Report dated Sep. 6, 2016 in PCT/JP2016/066154 filed Jun. 1, 2016.

* cited by examiner

*Primary Examiner* — William K Cheung
(74) *Attorney, Agent, or Firm* — Oblon, McClelland, Maier & Neustadt, L.L.P.

(57) ABSTRACT

A (meth)acrylic acid copolymer (A) having a weight average molecular weight of 1000 to 1,000,000, and in which when the half-width of the primary scatter peak when measured by small angle X-ray scattering is defined as X, 0.12<X, is used as an adhesive. The (meth)acrylic copolymer (A) is obtained by polymerizing a monomer mixture containing a macromonomer (a) having a number average molecular weight of 500-100,000, and a vinyl monomer (b). The adhesive has sufficient holding force and adhesive force, and the occurrence of adhesive deposit can be prevented when peeled off.

10 Claims, No Drawings

(METH)ACRYLIC COPOLYMER, ADHESIVE COMPOSITION AND ADHESIVE SHEET CONTAINING SAME, AND COATING MATERIAL AND COATED PRODUCT USING SAME

This application is a national stage of PCT International Application No. PCT/JP2016/066154 filed in Japan on Jun. 1, 2016, which claims priority of Japanese Patent Application No. 2015-111997 filed in Japan on Jun. 2, 2015, and Japanese Patent Application No. 2015-219589 filed in Japan on Nov. 9, 2015, the disclosures of which are incorporated herein in their entirety by reference.

TECHNICAL FIELD

The present invention relates to a (meth)acrylic copolymer in which macromonomers are copolymerized, and an adhesive composition and an adhesive sheet, each containing the same. Further, the invention relates to a coating material and a coated product, each being obtained by using the (meth)acrylic copolymer.

BACKGROUND ART

Conventionally, various kinds of copolymers having different physical properties have been synthesized by copolymerizing vinyl monomers alone or various vinyl monomer mixtures. Among them, since a polymer using a single vinyl monomer cannot satisfy various physical properties requirements, generally, a method of copolymerizing a mixture containing two or more kinds of vinyl monomers or a method of mixing different copolymers has been used. However, when merely copolymerizing various kinds of vinyl monomer mixtures, characteristics of each monomer unit have been tended to be averaged.

In addition, when merely mixing two or more kinds of copolymers, in many cases, the characteristics of the mixture thereof were inferior to those of each monomer unit without the copolymers being merged with each other.

In order to solve these problems, studies on copolymers using macromonomers have been conducted. The macromonomer is a high molecular weight monomer having a polymerizable functional group. The copolymer in which macromonomers are copolymerized is characterized in that individual properties can be expressed without impairing the properties of each of the macromonomer moiety and the monomer unit copolymerized with the macromonomer. Therefore, for example, various copolymers using this type of macromonomer have been also proposed in the field of adhesives.

For example, Patent Literature 1 discloses an adhesive composition containing a copolymer dispersed in an aqueous medium having a specific solid content by copolymerizing a macromonomer having a number average molecular weight of 2,000 g/mol to 50,000 g/mol and an ethylenic unsaturated monomer.

Further, Patent Literature 2 discloses a resin composition for an adhesive, which is obtained by copolymerizing an alkyl (meth)acrylate monomer and a macromonomer having a number average molecular weight of 1,000 to 200,000 and a glass transition temperature of 30° C. to 150° C.

CITATION LIST

Patent Literature

Patent Literature 1: WO 2002/022755 A
Patent Literature 2: JP 11-158450 A

SUMMARY OF THE INVENTION

Problem to be Solved by the Invention

However, the copolymers disclosed in Patent Literature 1 and Patent Literature 2 are problematic in that the molecular weight of the obtained copolymer is too large or the copolymerization ratio with the macromonomer is not appropriate, so that sufficient coating workability cannot be obtained in various coating methods, and the obtained adhesive does not have sufficient holding force.

Further, if the adhesive force of an adhesive is increased, it is easy for adhesive deposit to remain on an adhered surface when peeled off, and thus it is difficult to suppress the occurrence of adhesive deposit while maintaining sufficient holding force and adhesive force.

Means for Solving Problem

The invention relates to a (meth)acrylic copolymer (A) having a weight average molecular weight of 1,000 to 1,000,000 and satisfying $0.12<X$ when X is defined as a half width of a primary scatter peak in small angle X-ray scattering measurement.

Further, the invention relates to an adhesive composition including the (meth)acrylic copolymer (A).

Moreover, the invention relates to an adhesive sheet using the adhesive composition.

In addition, the invention relates to a coating material and a coated product, each being obtained by using the above (meth)acrylic copolymer (A).

Effect of the Invention

Since the (meth)acrylic copolymer (A) of the invention is characterized in that each of the macromonomer unit and the unit including the vinyl monomer (b), the adhesive composition using this (meth)acrylic copolymer (A) can be applied by various coating methods, for example, a hot melt method in which a resin composition is applied by directly heating the resin composition and a solution coating method in which a resin composition is applied after adding a solvent. Further, the (micro) phase separation structure of the (meth) acrylic copolymer (A) is optimized, so that the adhesive sheet obtained using the obtained adhesive composition has sufficient holding force and adhesive force, and the contamination of a substrate due to adhesive deposit can be prevented.

MODE(S) FOR CARRYING OUT THE INVENTION

Next, the invention will be described based on embodiments. However, the invention is not limited to the embodiments described below.

The (meth)acrylic copolymer (A) of the invention satisfies the following conditions.

(1) The weight average molecular weight thereof is 1,000 to 1,000,000

(2) The half width X of a primary scatter peak in small angle X-ray scattering measurement is 0.12<X.

The (meth)acrylic copolymer (A) according to the invention can be obtained by conducting addition of a specific macromonomer (a) to a polymerization product composed of a vinyl monomer (b), or can be obtained by polymerizing a monomer mixture including a specific macromonomer (a) and a vinyl monomer (b). Hereinafter, details will be described in order.

(1) Monomer Mixture

<Macromonomer (a)>

In the invention, the macromonomer (a) includes those having a radical polymerizable group or a functional group such as a hydroxyl group, an isocyanate group, an epoxy group, a carboxyl group, an amino group, an amide group, a thiol group or the like. Among the above, those having a radical polymerizable group copolymerizable with the vinyl monomer (b) are particularly preferable. The macromonomer (a) may have two or more radical polymerizable groups, but it is particularly preferable that the macromonomer (a) has one radical polymerizable group. In a case where the macromonomer (a) has a functional group, the macromonomer (a) may have two or more functional groups, but it is particularly preferable that the macromonomer (a) has one functional group. Further, the macromonomer (a) may have either or both of the radical polymerizable group and the functional group. In a case where the macromonomer (a) contains both the radical polymerizable group and the functional group, the macromonomer (a) may contain two or more functional groups to enable addition to a polymer unit composed of the vinyl monomer (b), two or more functional groups other than the radical polymerizable group copolymerizable with the vinyl monomer (b), or two or more radical polymerizable groups. In a case where the macromonomer (a) has a radical polymerizable group, the macromonomer includes a compound having two or more constituent units represented by Formula (a') below (hereinafter, referred to as constituent unit (a')). Ps in two or more constituent units (a') may be the same as or different from each other. Qs in two or more constituent units (a') may be the same as or different from each other. The macromonomer (a) may further have other constituent units than the constituent unit (a').

[Chem. 1]

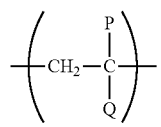

In Formula (a') above, P represents a hydrogen atom, a methyl group, or $CH_2OH$. Q is selected from the group consisting of OR, $O_2CR$, halogen, $CO_2H$, COR, $CO_2R$, CN, $CONH_2$, CONHR, $CONR_2$, $COOCH(CH_3)OR$, and R'; R is selected from the group consisting of a hydrogen atom, substituted and unsubstituted alkyl substituted and unsubstituted aryl, substituted and unsubstituted heteroaryl, substituted and unsubstituted aralkyl, substituted and unsubstituted alkaryl, and substituted and unsubstituted organosiylyl; the substituents are the same as or different from each other, and are selected from the group consisting of carboxylic acid, carboxylic acid ester, epoxy, hydroxyl, alkoxy, primary amino, secondary amino, tertiary amino, isocyanato, sulfonic acid, and halogen; R' is selected from the aromatic group consisting of substituted and unsubstituted aryl, substituted and unsubstituted heteroaryl; and the substituents are the same as or different from each other, and are selected from the group consisting of carboxylic acid, carboxylic acid ester, epoxy, hydroxyl, alkoxy, primary amino, secondary amino, tertiary amino, isocyanato, sulfonic acid, substituted and unsubstituted alkyl, substituted and unsubstituted aryl, substituted and unsubstituted olefins, and halogen.

In the invention, the number average molecular weight of the macromonomer (a) is preferably 500 or more and 100,000 or less. From the relationship of balance between adhesive force and coatability, the number average molecular weight thereof is preferably 30,000 or less, further preferably 800 to 6,000, and particularly preferably 1,000 to 5,500.

Various kinds of monomers forming a constituent unit (a') of macromonomer (a) and other constituent units in the invention are used. Examples thereof may include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, isoamyl (meth)acrylate, hexyl (meth)acrylate, octyl (meth)acrylate, lauryl (meth)acrylate, stearyl (meth)acrylate, isostearyl (meth)acrylate, hexadecyl (meth)acrylate, nonyl (meth)acrylate, isononyl (meth)acrylate, 4-t-butylcyclohexyl (meth)acrylate, phenyl (meth)acrylate, benzyl (meth)acrylate, cyclohexyl (meth)acrylate, tetrahydrofurfuryl (meth)acrylate, isobornyl (meth)acrylate, 3,5,5-trimethylcyclohexyl (meth)acrylate, dicyclopentanyl (meth)acrylate, dicyclopentenyl (meth)acrylate, dicyclopentenyloxyethyl (meth)acrylate, terpenacrylate and derivatives thereof; hydrogenated rosin acylate and derivatives thereof; dodecyl (meth)acrylate, glycidyl (meth)acrylate, 2-ethylhexyl (meth)acrylate; hydroxyl group-containing (meth)acrylic acid esters such as 2-hydroxyethyl (meth)acrylate, 2-hydroxypropyl (meth)acrylate, 2-hydroxybutyl (meth)acrylate, 3-hydroxybutyl (meth)acrylate, 4-hydroxybutyl (meth)acrylate, and glycerol (meth)acrylate; carboxyl group-containing vinyl monomers such as (meth)acrylic acid, 2-(meth)acryloyloxyethylhexahydrophthalic acid, 2-(meth)acryloyloxypropylhexahydrophthalic acid, 2-(meth)acryloyloxyethylphthalic acid, 2-(meth)acryloyloxypropylphthalic acid, (meth)acryloyloxyethylmaleic acid, 2-(meth)acryloyloxypropylmaleic acid, 2-(meth)acryloyloxyethylsuccinic acid, 2-(meth)acryloyloxypropylsuccinic acid, crotonic acid, fumaric acid, maleic acid, itaconic acid, monomethyl maleate, and monomethyl itaconate; acid anhydride group-containing vinyl monomers such as maleic anhydride and itaconic anhydride; epoxy group-containing vinyl monomers such as glycidyl (meth)acrylate, glycidyl α-ethyl acrylate, and 3,4-epoxybutyl (meth)acrylate; amino group-containing (meth)acrylic acid ester-based vinyl monomers such as dimethylaminoethyl (meth)acrylate and diethylaminoethyl (meth)acrylate; amide group-containing vinyl monomers such as (meth)acrylamide, N-t-butyl (meth)acrylamide, N-methylol (meth)acrylamide, N-isopropyl acrylamide, hydroxyethyl acrylamide, N-methoxymethyl (meth)acrylamide, N-butoxymethyl (meth)acrylamide, diacetone acrylamide, maleic acid amide, and maleimide; vinyl monomers such as styrene, α-methylstyrene, vinyltoluene, (meth)acrylonitrile, vinyl chloride, vinyl acetate, and vinyl propionate; polyfunctional vinyl monomers such as divinylbenzene, ethyleneglycol di(meth)acrylate, 1,3-butyleneglycol (meth)

acrylate, 1,6-hexanediol di(meth)acrylate, triethyleneglycol di(meth)acrylate, tetraethyleneglycol di(meth)acrylate, tripropyleneglycol di(meth)acrylate, trimethylolpropane tri(meth)acrylate, allyl (meth)acrylate, and N,N'-methylene bis(meth)acrylamide; acryloylmorpholine, polyethylene glycol (meth)acrylate, polypropylene glycol (meth)acrylate, methoxyethyl (meth)acrylate, ethoxyethyl (meth)acrylate, n-butoxyethyl (meth)acrylate, isobutoxyethyl (meth)acrylate, t-butoxyethyl (meth)acrylate, ethoxyethoxyethyl (meth)acrylate, phenoxyethyl (meth)acrylate, nonylphenoxyethyl (meth)acrylate, 3-methoxybutyl (meth)acrylate, acetoxyethyl (meth)acrylate, "PLACCEL FM" (caprolactone-addition monomer, manufactured by Daicel Corporation, trade name), "BLEMMER PME-100" (methoxy polyethylene glycol methacrylate (having two ethylene glycol chains), manufactured by NOF CORPORATION, trade name), "BLEMMER PME-200" (methoxy polyethylene glycol methacrylate (having four ethylene glycol chains), manufactured by NOF CORPORATION, trade name), "BLEMMER PME-400" (methoxy polyethylene glycol methacrylate (having nine ethylene glycol chains), manufactured by NOF CORPORATION, trade name), "BLEMMER 50POEP-800B" (octoxy polyethylene glycol-polypropylene glycol methacrylate (having eight ethylene glycol chains and six propylene glycol chains), manufactured by NOF CORPORATION, trade name), "BLEMMER 20ANEP-600" (nonylphenoxy (ethyleneglycol-polypropyleneglycol) monoacrylate manufactured by NOF CORPORATION, trade name), "BLEMMER AME-100" (manufactured by NOF CORPORATION, trade name), "BLEMMER AME-200" (manufactured by NOF CORPORATION, trade name), "BLEMMER 50AOEP-800B" (manufactured by NOF CORPORATION, trade name), VISCOAT#150 (trade name, manufactured by OSAKA ORGANIC CHEMICAL INDUSTRY LTD.), VISCOAT#190 (trade name, manufactured by OSAKA ORGANIC CHEMICAL INDUSTRY LTD.), VISCOAT#230 (trade name, manufactured by OSAKA ORGANIC CHEMICAL INDUSTRY LTD.), 2-methacryloyloxyethyl acid phosphate; silicone-based monomers such as SILAPLANE FM-0711 (trade name, manufactured by JNC Corporation), SILAPLANE FM-0721 (trade name, manufactured by JNC Corporation), SILAPLANE FM-0725 (trade name, manufactured by JNC Corporation), SILAPLANE TM-0701 (trade name, manufactured by JNC Corporation), SILAPLANE TM-0701T (trade name, manufactured by JNC Corporation), X-22-174 DX (trade name, manufactured by Shin-Etsu Chemical Co., Ltd.), X-22-2426 (trade name, manufactured by Shin-Etsu Chemical Co., Ltd.), X-22-2475 (trade name, manufactured by Shin-Etsu Chemical Co., Ltd.), and 3-(meth)acryloxypropylmethyldimethoxysilane; silane coupling agent-containing monomers such as 3-(meth)acryloxypropyl trimethoxysilane, 3-(meth)acryloxypropylmethyl diethoxysilane, 3-(meth)acryloxypropyl triethoxysilane, 3-acryloxypropyl trimethoxysilane, vinyl trimethoxysilane, and vinyl triethoxysilane; fluorine-containing monomer such as 2,2,2-trifluoroethyl (meth)acrylate, 2,2,3,3,3-pentafluorophenyl (meth)acrylate, 2-(perfluorobutyl)ethyl (meth)acrylate, 3-(perfluorobutyl)-2-hydroxypropyl (meth)acrylate, 2-(perfluorohexyl)ethyl (meth)acrylate, 3-perfluorohexyl-2-hydroxypropyl (meth)acrylate, 3-(perfluoro-3-methylbutyl)-2-hydroxypropyl (meth)acrylate, 2,2,3,3-tetrafluoropropyl (meth)acrylate, 1H,1H,5H-octafluoropentyl (meth)acrylate, 1H,1H,5H-octafluoropentyl (meth)acrylate, 1H,1H,2H,2H-tridecafluorooctyl (meth)acrylate, 1H-1-(trifluoromethyl) trifluoroethyl (meth)acrylate, 1H,1H,3H-hexafluorobutyl (meth)acrylate, 1,2,2,2-tetrafluoro-1-(trifluoromethyl)ethyl (meth)acrylate; monomers having an acetal structure such as 1-butoxyethyl (meth)acrylate, 1-(2-ethylhexyloxy)ethyl (meth)acrylate, 1-(cyclohexyloxy)ethyl (meth)acrylate), and 2-tetrahydropyranyl (meth)acrylate; and 4-(meth)acryloyloxybenzophenone, 2-isocyanatoethyl (meth)acrylate, and the like.

Among these, from the viewpoint of glass transition temperature, easiness of polymerization, and improvement of holding force, methacrylic acid esters are preferable. Methyl methacrylate, n-butyl (meth)acrylate, isobutyl (meth)acrylate, t-butyl (meth)acrylate, cyclohexyl (meth)acrylate, isobornyl (meth)acrylate, hydroxyethyl (meth)acrylate, and hydroxypropyl (meth)acrylate are more preferable.

Further, the macromonomer (a) preferably contains 50 to 100 parts by mass of methacrylic acid ester as a constituent component. The content of methacrylic acid ester is more preferably 70 to 100 parts by mass, and further preferably 90 to 100 parts by mass. When the content of methacrylic acid ester as the constituent component of the macromonomer (a) is 50 parts by mass or more, the molecular weight thereof can be lowered.

Further, from the viewpoint of productivity, the constituent unit derived from a carboxyl group-containing monomer contained in the macromonomer (a) is preferably 0 to 10 mass % or less.

In the invention, as the macromonomer (a), one in which a radical polymerizable group is introduced at the end of a main chain containing two or more constituent units (a') is preferable, and one having an end structure represented by Formula (1) below is preferable. In Formula (1), symbol " . . . " represents a main chain moiety including two or more constituent units (a').

[Chem. 2]

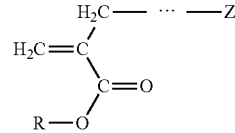

(1)

In Formula (1) above, R can have the same as the aforementioned R

R includes, for example, a branched or linear alkyl group having 1 to 20 carbon atoms. Specific examples of the branched or linear alkyl group having 1 to 20 carbon atoms include a methyl group, an ethyl group, an n-propyl group, an i-propyl group, an n-butyl group, a t-butyl group, an i-butyl group, a pentyl group, a hexyl group, a heptyl group, an octyl group, a nonyl group, an undecyl group, a dodecyl group, a tridecyl group, a tetradecyl group, a pentadecyl group, a hexadecyl group, a heptadecyl group, an octadecyl group, a nonadecyl group, and an icosyl group. Among these, from easiness of availability, a methyl group, an ethyl group, an n-propyl group, an i-propyl group, an n-butyl group, a t-butyl group, a pentyl group, a hexyl group, a heptyl group, and an octyl group are preferable, and a methyl group, an ethyl group, an n-propyl group, an i-propyl group, an n-butyl group, and a t-butyl group are more preferable.

R includes, for example, a cycloalkyl group having 3 to 20 carbon atoms. Specific examples of the cycloalkyl group having 3 to 20 carbon atoms include a cyclopropyl group, a cyclobutyl group, a cyclopentyl group, a cyclohexyl group, a cycloheptyl group, a cyclooctyl group, and an adamantyl group. From easiness of availability, a cyclopropyl group, a cyclobutyl group, and an adamantyl group are preferable.

R includes, for example, an aryl group having 6 to 18 carbon atoms. Specific examples of the aryl group having 6 to 18 carbon atoms include a phenyl group, a naphthyl group, and a benzophenone structure.

R includes, for example, a heterocyclic group having 5 to 18 carbon atoms. Specific examples of the heterocyclic groups of R or $R^1$ to $R''$ include a T-butyrolactone group and a ε-caprolactone group.

The substituent which R may have is a group or atom selected from the group consisting of an alkyl group, an aryl group, a carboxyl group, an alkoxycarbonyl group (—COOR''), a cyano group, a hydroxyl group, an amino group (—NR''R'''), an amide group (—CONR''R'''), a halogen, an allyl group, an epoxy group, an alkoxy group (—OR''), a siloxy group, and a group exhibiting hydrophilicity or ionicity. Here, R'' or R''' independently represents the same as R.

The alkoxycarbonyl group of the above substituent includes, for example, a methoxycarbonyl group.

The amino group of the above substituent includes, for example, an amino group, a monomethylamino group, and a dimethylamino group.

The amide group of the above substituent includes, for example, a carbamoyl group (—$CONH_2$), an N-methylcarbamoyl group (—CONHMe), and an N,N-dimethylcarbamoyl group (dimethylamide group: —$CONMe_2$).

The halogen of the above substituent includes, for example, fluorine, chlorine, bromine, and iodine.

The alkoxy group of the above substituent includes, for example, an alkoxy group having 1 to 12 carbon atoms, and specific example thereof include a methoxy group.

The group exhibiting hydrophilicity or ionicity of the above substituent includes, for example, cationic substituents, such as alkali salt of carboxyl group or alkali salt of sulfoxyl group, poly(alkylene oxide) groups such as a polyethylene oxide group and a polypropylene oxide group, and quaternary ammonium base.

Z is an end group of the macromonomer (a). Examples of the end group of the macromonomer (a) include groups derived from a hydrogen atom and a radical polymerization initiator, like the end groups of polymers obtained by known radical polymerization.

Preferably, the macromonomer (a) contains a monomer constituent unit having a (meth)acryloyl group in an amount of 80 mass % or more. Particularly preferably, the macromonomer (a) has a structure represented by Formula (2) below.

[Chem. 3]

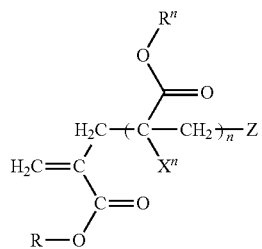

(2)

In Formula (2) above, n is a natural number of 2 to 100,000. R and $R''$ each independently can be the same as the above-mentioned R. n pieces of $R''$ may be the same as or different from each other. $X''$ can be the same as the above-mentioned P in Formula (a'). n pieces of $x''$ may be the same as or different from each other. Z is an end group.

Z is the same end group as the Z in Formula (1).

Glass Transition Temperature (Tga)

In the invention, the glass transition temperature (Tga) of the macromonomer (a) is preferably 0° C. to 150° C. From the viewpoint that sufficient holding force can be exhibited when used as an adhesive, the glass transition temperature (Tga) thereof is more preferably 10° C. to 120° C., and further preferably 30° C. to 120° C. Tga can be measured by a differential scanning calorimeter (DSC).

Method of Preparing Macromonomer (a)

As the macromonomer (a), one prepared by a known method may be used, or a commercially available one may be used. Examples of the method of preparing the macromonomer (a) having a radical polymerizable group include a preparation method using a cobalt chain transfer agent, a method of using an α-substituted unsaturated compound such as α-methylstyrene dimer as a chain transfer agent, a method of chemically bonding a radical polymerizable group to a polymer, and a method using thermal cracking.

Among these, as the method of preparing the macromonomer (a), in terms of using a catalyst having a small number of process steps and a high chain transfer constant, a preparation method using a cobalt chain transfer agent is preferable. In the case of the preparation method using a cobalt chain transfer agent, the structure of the macromonomer (a) corresponds to that represented by Formula (1).

Examples of the method of preparing the macromonomer (a) having a functional group that enables addition to a polymer composed of the vinyl monomer (b) include a method of copolymerizing vinyl monomers having the corresponding functional group, a method of introducing a functional group using a chain transfer agent such as thioglycol or thioglycolic acid, and a method of introducing a functional group using an initiator.

Examples of the method of preparing the macromonomer (a) include aqueous dispersion polymerization methods such as a bulk polymerization method, a solution polymerization method, a suspension polymerization method, and an emulsion polymerization method. Particularly, in a case where the macromonomer (a) is prepared using a cobalt chain transfer agent, from the viewpoint that a recovery process is simple, an aqueous dispersion polymerization method is preferable.

Examples of the method of chemically bonding a radical polymerizable group to a polymer include a method of preparing the macromonomer by substituting a halogen group of a polymer having a halogen group with a compound having a radical polymerizable carbon-carbon double bond, a method of reacting a vinyl monomer having an acid group with a vinyl polymer having an epoxy group, a method of reacting a vinyl polymer having an epoxy group with a vinyl monomer having an acid group, and a method of reacting a vinyl polymer having a hydroxyl group with an isocyanate compound to obtain a vinyl polymer having an isocyanate group and reacting the obtained vinyl polymer with a vinyl monomer having a hydroxyl group. The macromonomer (a) may be prepared by any one of the above methods.

<(Meth)Acrylic Copolymer (A)>

The content of the macromonomer (a) in the (meth)acrylic copolymer (A) is preferably 7 to 40 mass %. When the content of the macromonomer (a) is 7 mass % or more, holding force tends to be good when used as an adhesive. When the content thereof is 40 mass % or less, coatability tends to be good. From the viewpoint of the holding force and coatability of an adhesive, the content of the macromonomer (a) is preferably 8 to 30 mass %, and more preferably 9 to 20 mass %.

Vinyl Monomer (b)

As the vinyl monomer (b) used in the invention, a vinyl monomer equivalent to the monomer for obtaining the macromonomer (a) can be used. The vinyl monomer (b) can also be copolymerized with monomers other than (meth) acrylic monomers. In particular, 2-ethylhexyl acrylate, n-octyl acrylate, isooctyl acrylate, nonyl acrylate, isononyl acrylate, lauryl acrylate, n-butyl acrylate, and ethyl acrylate are preferable because they can express flexibility as an adhesive, and can suppress the water absorption of the (meth) acrylic copolymer (A) and can adjust the electrical characteristics, such as relative dielectric constant and the like, of the (meth)acrylic copolymer (A) due to hydrophobicity. In particular, in order to suppress the relative dielectric constant to be low at 3.5 or less, a (meth)acrylic acid ester having an alkyl chain of C6 or more is suitably used.

In addition to above, (meth) acrylic acid, hydroxyethyl (meth)acrylate, hydroxypropyl (meth)acrylate, methyl (meth)acrylate, styrene, isobornyl (meth)acrylate, cyclohexyl (meth)acrylate, and the like are preferable. The vinyl monomer (b) may be used alone or in combination of two or more.

Further, when conducting addition of the macromonomer (a) to a polymer composed of the vinyl monomer (b), suitably, the vinyl monomer (b) has a functional group capable of reacting with the functional group of the macromonomer (a).

<(Meth)Acrylic Copolymer (A)>

The (meth)acrylic copolymer (A) is a polymer including the macromonomer (a) unit and a polymer unit composed of the vinyl monomer (b). In the method of preparing the (meth)acrylic copolymer (A), the (meth)acrylic copolymer (A) can be prepared by known polymerization methods such a solution polymerization method, a suspension polymerization method, and an emulsion polymerization method. In the invention, in order for the (meth)acrylic copolymer (A) to be used as an adhesive composition, the solution polymerization method is preferable.

In the invention, the (meth)acrylic copolymer (A) can also contain at least one selected from a polymer having only a repeating unit derived from the macromonomer (a), a polymer having a repeating unit derived from one or more vinyl monomers (b), unreacted macromonomer (a), and unreacted vinyl monomer (b).

Further, the (meth)acrylic copolymer (A) includes at least one selected from a block type copolymer having a repeating unit derived from the macromonomer (a) and the vinyl monomer (b) and a graft type copolymer having a repeating unit derived from the macromonomer (a) at a side chain thereof and having a vinyl monomer at a main chain thereof.

(1) Weight Average Molecular Weight

The weight average molecular weight (Mw) of the (meth) acrylic copolymer (A) is 1,000 to 1,000,000. When the weight average molecular weight (Mw) thereof is 1,000 or more, the durability of an adhesive composition tends to be good. When the weight average molecular weight (Mw) thereof is 1,000,000 or less, coatability tends to be good. From the viewpoint of coatability, the weight average molecular weight (Mw) of the (meth)acrylic copolymer (A) is preferably 50,000 to 700,000, more preferably 80,000 to 500,000, and further preferably 130,000 to 500,000.

(2) Half Width of Primary Scatter Peak in Small Angle X-Ray Scattering Measurement The small angle X-ray scattering measurement is a method of obtaining structural information on a nanoscale (1 to 100 nm) by observing scattered X-rays having a scattering angle of several degrees or less. In the invention, as an indicator of a state of (micro) phase separation of a copolymer, a (meth)acrylic copolymer in which a half width X of primary scatter peak in small angle X-ray scattering measurement is more than 0.12 is selectively used. When the half width X is more than 0.12, in the case of forming an adhesive sheet using the adhesive composition comprising the (meth)acrylic copolymer (A) according to the invention, the occurrence of adhesive deposit is suppressed when the adhesive sheet is peeled off in spite of excellent holding force and adhesive force. The preferable range of the half width X is more than 0.12 and 1.0 or less. The upper limit of the half width X is more preferably 0.5 or less, and further preferably 0.4 or less.

Further, in the small angle X-ray scattering measurement, the ratio X/Y of half width X to peak position Y of scattering spectrum is preferably $0.44 < X/Y < 10$.

The (micro) phase separation structure may include a lamellar structure, a gyroid structure, a cylinder structure, and a sphere structure. However, any of these structures may be used.

The melt viscosity of the (meth)acrylic copolymer (A) of the invention at 130° C. is preferably 20 to 800 Pa·s. When the melt viscosity thereof at 130° C. within the above range, coating can be carried out by a hot melt method in which a resin composition is directly heated and applied. The melt viscosity thereof can be measured by using a viscoelasticity measuring device Rheosol-G5000 manufactured by UBM Corporation. In the invention, the viscosity ($\eta^*$) value, measured under conditions of a distortion of 0.7% at 130° C. and a frequency of 0.02 Hz using a cone plate of 25 mm$\phi$, was set to a value of melt viscosity at 130° C. From the viewpoint of coatability, the melt viscosity thereof is preferably 20 to 600 Pa·s, more preferably 50 to 600 Pa·s, and further preferably 100 to 500 Pa·s.

Preferably, the (meth)acrylic copolymer (A) of the invention has a relative dielectric constant of 3.5 or less. When the relative dielectric constant thereof is 3.5 or less, the thickness of an adhesive layer at the time of mounting on a touch panel can be reduced, and the responsiveness of the touch panel can be improved.

<Method of Preparing (Meth)Acrylic Copolymer (A)>

Although not particularly limited, in the method of preparing the (meth)acrylic copolymer (A) satisfying the above conditions (1) and (2), as described above, the (meth)acrylic copolymer (A) can be obtained by polymerizing a monomer mixture including the macromonomer (a) and the vinyl monomer (b).

<Adhesive Composition>

The adhesive composition of the invention comprises the (meth)acrylic copolymer (A).

The adhesive composition of the invention may contain known components blended in a general adhesive composition. For example, a filler can be added in order to impart heat resistance, thermal conductivity, flame retardancy, electrical conductivity, and the like. Examples of the filler include inorganic filler such as metallic powder such as zinc oxide powder and titanium oxide powder, carbon black such as acetylene black, talc, glass powder, silica powder, conductive particles, and glass powder, and organic filer such as polyethylene powder, polyester powder, polyamide powder, fluororesin powder, polyvinyl chloride powder, epoxy resin powder, and silicone resin powder. These fillers may be used alone or in combination of two or more.

Further, by introducing a functional group into the (meth) acrylic copolymer (A), an adhesive composition blended a crosslinker or a polymerization initiator can be obtained and a crosslinked adhesive sheet can be made from the adhesive composition. Examples of the crosslinker include an isocyanate-based crosslinker, an epoxy-based crosslinker, a metal chelate-based crosslinker, a photocurable crosslinker, a melamine-based crosslinker, and an aziridine-based crosslinker. They can be used in combination of two or more.

Examples of the isocyanate-based crosslinker include aromatic polyisocyanates such as xylylene diisocyanate, diphenylmethane diisocyanate, triphenylmethane triisocyanate and tolylene diisocyanate; aliphatic or alicyclic polyisocyanates such as hexamethylene diisocyanate, isophorone diisocyanate, and hydrogenated products of the aromatic polyisocyanates; dimers or trimers of these polyisocyanates; and adducts composed of polyols such as these polyisocyanates and trimethylolpropane. They can be used alone or in combination of two or more.

Examples of the epoxy-based crosslinker include ethylene glycol diglycidyl ether, polyethylene glycol diglycidyl ether, 1,6-hexanediol diglycidyl ether, bisphenol A type epoxy resin, N,N,N',N'-tetraglycidyl-m-xylenediamine, 1,3-bis(N, N-diglycidylaminomethyl) cyclohexane, N,N-diglycidylaniline, and N,N-diglycidyltoluidine.

Examples of the metal chelate-based crosslinker include those in which a polyvalent metal is covalently bonded or coordinately bonded to an organic compound. Examples of the polyvalent metal include aluminum, nickel, chromium, copper, iron, tin, titanium, zinc, cobalt, manganese, and zirconium.

Examples of the organic compound to be covalently bonded or coordinately bonded include those having oxygen such as a ketone compound such as acetylacetone, an alkyl ester, an alcohol compound, a carboxylic acid compound, and an ether compound.

Examples of the melamine-based crosslinker include hexamethoxymethyl melamine, hexaethoxymethyl melamine, hexapropoxymethyl melamine, hexaptoxymethyl melamine, hexapentyloxymethyl melamine, hexahexyloxymethyl melamine, and melamine resin.

Examples of the aziridine-based crosslinker include tetramethylolmethane-tri-f-aziridinyl propionate, trimethylolpropane-tri-β-aziridinyl propionate, N,N'-diphenylmethane-4,4'-bis(1-aziridinecarboxamide), and N,N'-hexamethylene-1,6-bis(l-aziridinecarboxamide).

The adhesive composition according to the invention can be prepared by adding a reaction initiator such as a photopolymerization initiator, or adding at least one selected from a polyfunctional (meth)acrylate having two or more (meth) acryloyl groups, a vinyl monomer, and an oligomer component as a crosslinker, and a reaction initiator such as a photopolymerization initiator, and then performing crosslinking by ultraviolet irradiation or the like. Examples of this kind of crosslinker include polyfunctional (meth)acrylates having two or more (meth)acryloyl groups; polyfunctional organic resins having two or more functional groups such as an isocyanate group, an epoxy group, a melamine group, a glycol group, a siloxane group, and an amine; organometallic compounds having metal complexes such as zinc, aluminum, sodium, zirconium, and calcium; and polyfunctional (meth)acrylates such as triethylene glycol diacrylate, polyalkylene glycol diacrylate, bisphenol A-EO/PO modified diacrylate, alkoxylated hexanediol diacrylate, polyisobutylene diacrylate, alkoxylated trimethylolpropane triacrylate, pentaerythritol triacrylate, alkoxylated pentaerythritol triacrylate, alkoxylated pentaerythritoltetraacrylate, alkoxylated dipentaerythritol pentaacrylate, and caprolactone-modified dipentaerythritol pentaacrylate, and caprolactone-modified dipentaerythritol hexaacrylate.

Examples of the photopolymerization initiator include 2,2-dimethoxy-1,2-diphenylethan-1-one, 1-hydroxycyclohexyl phenyl ketone, 2-hydroxy-2-methyl-1-phenyl-propan-1-one, 1-(4-(2-hydroxyethoxy)phenyl)-2-hydroxy-2-methyl-1-propan-1-one, 2-hydroxy-1-[4-{4-(2-hydroxy-2-methyl-propionyl)benzyl}phenyl]-2-methyl-propan-1-one, oligo(2-hydroxy-2-methyl-1-(4-(1-methylvinyl)phenyl)propanone), methyl phenylglyoxylate, 2-methyl-1-(4-ethylthiophenyl)-2-morpholinopropane-1-one, benzophenone, 4-methyl-benzophenone, 2,4,6-trimethylbenzophenone, 2,4,6-trimethylbenzophenone, 4-phenylbenzophenone, 3,3'-dimethyl-4-methoxybenzophenone, 4-(1,3-acryloyl-1,4,7,10,13-pentaoxotridecyl)benzophenone, bis(2,4,6-trimethylbenzoyl)-phenylphosphine oxide, and 2,4,6-trimethylbenzoyldiphenylphosphine oxide.

As the vinyl polymerizable monomer, the same ones as those used for the macromonomer (a) can be exemplified.

Examples of the oligomer component include (meth) acrylic, urethane-based, isoprene-based, isoprene acrylate-based, urethane acrylate-based, polyester acrylate-based, styrene-based, epoxy-based, and olefin-based. These may have a photopolymerizable reactive group.

The present adhesive resin composition can appropriately contain various kinds of additives, such as a tackifying resin, an antioxidant, a light stabilizer, a metal deactivator, an anti-aging agent, a moisture absorbent, a rust inhibitor, an a hydrolysis inhibitor. The adhesive resin composition may appropriately contain a reaction catalyst (a tertiary amine compound, a quaternary ammonium compound, a tin laurate compound, or the like).

Examples of the antioxidant include a phenol-based antioxidant, a phosphorus-based antioxidant, a hydroxylamine-based antioxidant, and a sulfur-based antioxidant. Among them, a phenol-based antioxidant and a phosphorus-based antioxidant, causing less discoloration of resin after heating, are preferable. They may be used alone or in combination of two or more. The content of the antioxidant is preferably in a range of 0.1 to 5 parts by mass with respect to the (meth)acrylic copolymer (A).

The present adhesive resin composition can be used as an adhesive sheet by sheet molding. The adhesive sheet can be prepared by coating the adhesive resin composition in a solution state using a solvent or in a solution state diluted with a low-molecular-weight component in the composition, or can be prepared from a hot melt-based adhesive composition not using a solvent. When the hot melt-based adhesive composition not using a solvent is used, the adhesive sheet can be made thicker compared to when an adhesive composition using a solvent is used, so that, for example, the adhesive sheet can have enough thickness to fill voids between constituent members of an image display device. Further, this adhesive resin composition can be diluted with another polymerizable component or a crosslinker and applied, and then cured by ultraviolet irradiation, heating, or the like.

Further, the adhesive sheet obtained in the invention can be used for attaching various substrates, and exhibits very good adhesive performance. For example, the adhesive sheet can be used for attaching window-bonding films for vehicles or buildings or used for attaching labels in label display by applying this adhesive sheet to a transparent film or by processing this adhesive sheet into an adhesive film. In addition, the adhesive sheet can be used for attaching various kinds of panels such as liquid crystal panels in display or used for attaching transparent plates such as glass plates by processing this adhesive sheet into a transparent double-sided adhesive sheet.

Further, when the present adhesive resin composition is applied in a solution state using a solvent or in a solution state diluted with a component other than the (meth)acrylic copolymer (A), this adhesive resin composition can be used for the same use as the above adhesive sheet.

EXAMPLES

Hereinafter, the adhesive resin composition of the invention will be described in more detail with reference to Examples and Comparative Examples. However, the invention is not limited thereto. The "part" in Examples means "part by mass".

<Synthesis of Macromonomer (a-1)>
<Preparation of Dispersant 1>

900 Parts of deionized water, 60 parts of sodium 2-sulfoethyl methacrylate, 10 parts of potassium methacrylate, and 12 parts of methyl methacrylate (MMA) were put into a polymerization apparatus equipped with a stirrer, a cooling tube, and a thermometer, and stirred. The temperature of in the polymerization apparatus was raised to 50° C. while purging with nitrogen. During the process, 0.08 part of 2,2'-azobis(2-methylpropionamidine) dihydrochloride was added as a polymerization initiator, and the temperature was further raised to 60° C. After raising the temperature, MMA was continuously dropped at a rate of 0.24 parts/min for 75 minutes using a dropping pump, so as to obtain a reaction solution. The reaction solution was kept at 60° C. for 6 hours, and then cooled to room temperature, so as to obtain dispersant 1 having a solid content of 10 mass % as a transparent aqueous solution.

145 Parts of deionized water, 0.1 part of sodium sulfate, and 0.25 parts of dispersant 1 (solid content 10 mass %) were put into a polymerization apparatus equipped with a stirrer, a cooling tube, and a thermometer, and stirred, so as to obtain a uniform aqueous solution. Next, 100 parts of MMA, 0.004 parts of bis[(difluoroboryl)diphenylglyoximate] cobalt (II) as a chain transfer agent, and 0.4 parts of "PEROCTA O" (registered trademark) (1,1,3,3-tetramethylbutylperoxy 2-ethylhexanoate, manufactured by NOF Corporation) was added, so as to obtain an aqueous suspension.

Next, the inside of the polymerization apparatus was purged with nitrogen, and heated to 80° C. to perform a reaction for 1 hour, and, in order to further increase a polymerization rate, the temperature in the polymerization apparatus was raised to 90° C. and kept for 1 hour. Thereafter, the reaction solution was cooled to 40° C. to obtain an aqueous suspension containing a macromonomer. This aqueous suspension was filtered, and the residue was washed with deionized water, dehydrated, and dried at 40° C. for 16 hours, so as to obtain macromonomer (a-1). The number average molecular weight of this macromonomer (a-1) was 2500, and the glass transition temperature thereof, measured by DSC, was 80° C.

<Preparation of Macromonomers (a-2) to (a-4)>

Macromonomers (a-2) to (a-4) were prepared in the same manner as the macromonomer 1, except that the amounts (parts) of the monomer added to the dispersant 1, the polymerization initiator, and the chain transfer agent were changed as given in Table 1. The number average molecular weight (Mn) and glass transition temperature (Tga) of the obtained macromonomer (a) are also given in Table 1.

TABLE 1

|  |  | Macromonomer (a) | | | |
|---|---|---|---|---|---|
|  |  | a-1 | a-2 | a-3 | a-4 |
| Monomer composition | MMA (Parts) | 100 | 50 | 30 | 100 |
|  | IBXMA (Parts) | — | 50 | 70 | — |
| Polymerization initiator | (Parts) | 0.4 | 0.5 | 0.5 | 0.8 |
| Chain transfer agent | (Parts) | 0.004 | 0.003 | 0.003 | 0.008 |
| Physical properties | Mn | 2500 | 3000 | 2700 | 1400 |
|  | Tga (° C.) | 80 | 100 | 115 | 60 |

MMA: methyl methacrylate
IBXMA: isobornyl methacrylate (Evaluation Method)

Glass transition temperature (Tga) of macromonomer (a)

The glass transition temperature (Tga) of macromonomer (a) was measured under a nitrogen atmosphere at a heating rate of 5° C./min using a differential scanning calorimeter (DSC Smart Roader manufactured by Rigaku Corporation).

Molecular weights of macromonomer (a) and acrylic copolymer (A)

Macromonomer (a)

The molecular weight of macromonomer (a) was measured using Gel Permeation Chromatography (GPC) (HLC-8320 manufactured by Tosoh Corporation). After the content of a tetrahydrofuran solution of the macromonomer (a) was adjusted to 0.2 mass %, 10 μL of the solution was injected into an apparatus equipped with columns (TSK gel Super HZM-M×HZM-M×HZ 2000, TSK guard column Super HZ-L), and the molecular weight of the macromonomer (a) was measured under conditions of flow rate: 0.35 mL/min, eluent: tetrahydrofuran (stabilizer BHT) and column temperature: 40° C., and converted to standard polystyrene equivalent to calculate a number average molecular weight (Mn).

Acrylic Copolymer (A)

The molecular weight of acrylic copolymer (A) was measured using Gel Permeation Chromatography (GPC) (HLC-8120 manufactured by Tosoh Corporation). After the content of a tetrahydrofuran solution of the acrylic copolymer (A) was adjusted to 0.3 mass %, 20 μL of the solution was injected into an apparatus equipped with columns (TSK gel Super HM-H*4, TSK Guard column Super H-H), and the molecular weight of the acrylic copolymer (A) was measured under conditions of flow rate: 0.6 mL/min, eluent: tetrahydrofuran (stabilizer BHT) and column temperature: 40° C., and converted to standard polystyrene equivalent to calculate a weight average molecular weight (Mw).

Holding Force Test Evaluation

The resin solution prepared in Example was applied onto a 50 μm release PET film using a 500 μm applicator and dried at 90° C. for 90 minutes, and then the 50 μm release PET film was attached to an adhesive surface to obtain an adhesive sheet of release PET-adhesive layer-release PET. According to JIS Z 0237, one of the release films of this adhesive sheet was peeled off, and, alternatively, a PET film was pressed by a 2 kg hand roller. This adhesive sheet was cut into strips of 20 mm×100 mm, the other release film was peeled off, and the strips was attached to a SUS plate of 30 mm×100 mm using a 2 kg hand roller such that the area of the attached surface is 20 mm×25 mm. After curing at 70° C. for 30 minutes, a weight of 1 kg was attached to the end of the PET film, and holding time was measured in a constant-temperature zone at 70° C. Holding force was determined according to the following criteria.

S: Holding time is 20 minutes or more
A: Holding time is 5 minutes or more and less than 20 minutes
C: Holding time is less than 5 minutes Adhesion Test One release film of the adhesive sheet of release PET-adhesive layer-release PET prepared in the holding force test was peeled off, and, alternatively, a 50 µm PET film was attached thereto. This adhesive sheet was cut into strips having a width of 25 mm, and the peel strength (N/25 mm) of the strips to a glass substrate was measured under conditions of a peeling angle of 180° and a tension rate of 60 mm/min according to JIS Z 0237, so as to determine adhesive force. Further, the peeled glass substrate surface was visually observed to confirm the presence or absence of adhesive deposit. Adhesive deposit was determined according to the following criteria.

A: No adhesive deposit
B: Adhesive deposit somewhat exists, but there is no practical problem
C: Adhesive deposit exists, and there is a practical problem Relative Dielectric Constant Measurement Method The release PET film on one side of the adhesive sheet of release PET-adhesive layer-release PET prepared in the holding force test was peeled off, a 125 µm PET film was attached to one side of the adhesive sheet, and a 50 µm PET film was attached to the other side of the adhesive sheet, so as to prepare a measurement sample.

IMPEDANCE ANALYZER 4294 A manufactured by AGILENT Corporation was connected to 16451 B manufactured by the same company, and the electrostatic capacitance $C_B$ of the measurement sample at a frequency of 100 kHz was measured. The electrostatic capacitance $C_C$ of the 125 µm PET film and the electrostatic capacitance $C_D$ of the 50 µm PET film were also measured, and the electrostatic capacitance $C_A$ of the adhesive layer was calculated from Equation below.

$$(1/C_B)=(1/C_C)+(1/C_A)+(1/C_D)$$

The relative dielectric constant $\varepsilon_r$ of the adhesive layer was calculated by applying the electrostatic capacitance $C_A$ of the adhesive layer calculated from Equation above to Equation below. Further, the thickness of the adhesive layer was measured by a micrometer.

$$C_A=\varepsilon_0 \times \varepsilon_r \times \pi \times (L/2)^2/d$$

$\varepsilon_0$: Dielectric constant of vacuum=$8.854\times10^{-12}$
L: Diameter of measurement electrode=38 mm
d: Thickness of adhesive layer <Small Angle X-Ray Scattering Measurement>

Small angle X-ray scattering measurement was carried out by BL03 XU of Spring-8 (Frontier Soft Matter Development and Industry Association Beam Line) which is a large synchrotron radiation facility.

Only the adhesive layer, obtained by peeling the release PET from the sample sandwiched between both sides of the release PET prepared in the relative dielectric constant measurement, was provided on a jig for sample. The beam shape of X-ray was adjusted to 120 µm in width and 120 µm in length. The X-ray wavelength was set to 1 Å, and a CCD (Hamamatsu Photonics V 7739 P+ORCA R2) was used as a detector. The camera length was set to about 4 m, and correction was conducted using a standard sample (collagen). The kind, thickness and exposure time of an attenuator (attenuation plate) were adjusted, a detector was set so as not to be damaged by strong X-rays, and then the sample was irradiated with X-rays, so as to obtain a two-dimensional scattering image of the sample.

Background correction was carried out from the two-dimensional scattering image of the sample obtained by the above procedure. Specifically, a two-dimensional scattering image of the background obtained by performing the same operation as the above procedure was acquired, and the two-dimensional scattering image of the background was subtracted from the two-dimensional scattering image of the sample using image processing software (Image-J), so as to obtain a two-dimensional scattering image for analysis. Ring-shaped scattering was confirmed in the two-dimensional scattering image for analysis.

Next, the two-dimensional image for analysis was converted into a one-dimensional scattering spectrum. Specifically, the two-dimensional scattering image for analysis was read by X-ray data processing software (Fit 2d), and integrated over all the azimuth angles, thereby obtain a one-dimensional scattering spectrum in which horizontal axis is set to q ($nm^{-1}$) and vertical axis is set to scattering intensity. In the one-dimensional spectrum, a peak was found between q=0.2 and 0.4.

From the obtained one-dimensional scattering spectrum, the half width X of a peak and the peak position Y are obtained. In the one-dimensional scattering spectrum, there are a case where scattering intensity increases toward the origin by taking a minimum value around q=0.1 and a case where scattering intensity decreases toward the origin after passing through an inflection point around q=0.1. In a case where scattering intensity increases toward the origin by taking a minimum value around q=0.1, an area larger than q of the minimum value was taken as an analysis target. Further, in a case where scattering intensity decreases toward the origin after passing through an inflection point around q=0.1, an area larger than q of the inflection point was taken as an analysis target. Next, as baseline correction, the minimum value of scattering intensity of a region to be analyzed was obtained, and the obtained minimum value was subtracted over the entire region to perform the baseline correction. The half width of the composite function obtained by fitting the obtained one-dimensional spectrum after correction with Gaussian function and Lorenz function was taken as X, and the peak position thereof was taken as Y. Waveform separation software (Fityk) was used in the fitting.

Preparation Example 1

(Preparation of (meth)acrylic copolymer (A-1))

40 Parts of ethyl acetate as a main solvent, 8 parts of isopropyl alcohol, and 12.5 parts of macromonomer (a-2) were charged into a four-neck flask equipped with a stirrer, a thermometer, a cooling tube, and a nitrogen gas inlet, and external temperature was raised to 85° C. under nitrogen gas flow aeration. After internal temperature was stabilized, a mixture including 20 parts of ethyl acetate, 74 parts of 2-ethylhexyl acrylate, 3.5 parts of acrylic acid, and 0.04 part of benzoyl peroxide was dropped over 4.5 hours. After the dropping, the mixture was kept for 1 hour, and then a mixture including 0.5 part of "PEROCTA 0" and 10 parts of ethyl acetate was added over 1 hour. Then, after keeping for 2 hours, 0.5 part of "IRGANOX 1010" (trade name, manufactured by BASF Corporation) as an antioxidant and 22 parts of ethyl acetate were added, and then cooled to room temperature, so as to obtain (meth)acrylic copolymer (A-1).

Preparation Examples 2 to 13

(Preparation of (Meth)Acrylic Copolymers (A-2) to (A-13))

(Meth)acrylic copolymers (A-2) to (A-13) were obtained in the same manner as Preparation Example 1, except that the composition of the used monomer mixture (macromonomer (a) and vinyl monomer (b)) and the kind of the solvent for initial charging were changed as given in Table 2.

(Meth)acrylic copolymer (A-12) is an example in which the macromonomer (a) was not used.

2-HEMA: 2-hydroxyethyl methacrylate
EtOAc: ethyl acetate
IPA: isopropyl alcohol

Examples 1 to 11, Comparative Examples 1 and 2

The adhesive force, holding force, half width of primary scatter peak in small angle X-ray scattering measurement, and relative dielectric constant of the (meth)acrylic copolymer (A-1) prepared in Preparation Example 1 were measured, and the results thereof are given in Table 3. Similarly, those of the (meth)acrylic copolymers (A-2 to A-13) of Preparation Examples 2 to 13 were measured in the same manner (Table 3).

Example 12

The (meth) acrylic copolymer (A-3) prepared in Preparation Example 3 was desolvated and formed into a sheet by hot melt, and the adhesive force, holding force, half width of primary scatter peak in small angle X-ray scattering measurement, and relative dielectric constant of the sheet were measured. Hot melt condition: heat press 0.2 MPa, 100° C., 10 min, film thickness 150 μm.

TABLE 2

| | | | Preparation Example | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 | 13 |
| (Meth)acrylic copolymers (A) | | | A-1 | A-2 | A-3 | A-4 | A-5 | A-6 | A-7 | A-8 | A-9 | A-10 | A-11 | A-12 | A-13 |
| Monomer mixture (parts) | Macromonomer (a) | a-1 | 12.5 | 13.5 | — | — | 11 | — | — | — | — | — | — | — | 11 |
| | | a-2 | — | — | 14.6 | 14.6 | — | 13.5 | — | 15 | — | 22 | 30 | — | — |
| | | a-3 | — | — | — | — | — | — | 17 | — | — | — | — | — | — |
| | | a-4 | — | — | — | — | — | — | — | — | 13.5 | — | — | — | — |
| | Vinyl monomer (b) (parts) | MMA | — | — | — | — | — | — | — | — | — | — | — | 11 | — |
| | | 2-EHA | 74 | 62.5 | 82.4 | 82.3 | 86 | 80.5 | 80 | 76 | 62.5 | 70 | 60 | 86 | 86 |
| | | AA | 3.5 | 4 | 3 | 3 | 3 | — | 3 | 3 | 4 | 3 | 3 | 3 | 3 |
| | | MA | 10 | 20 | — | — | — | — | — | — | 20 | — | — | — | — |
| | | 2-HPMA | — | — | — | — | — | 6 | — | 6 | — | — | — | — | — |
| | | 2-HEMA | — | — | — | 0.1 | — | — | — | — | — | — | — | — | — |
| Initial charging solvent | | EtOAc | 40 | 40 | 40 | 40 | 40 | 30 | 30 | 30 | 30 | 30 | 40 | 40 | 40 |
| | | IPA | 8 | 6 | — | — | 7 | — | — | — | — | — | 7 | 7 | 1 |
| Polymerization initiator | | BMTK40 | 0.13 | 0.13 | 0.13 | 0.13 | 0.13 | 0.3 | 0.13 | 0.23 | 0.23 | 0.23 | 0.13 | 0.13 | 0.13 |
| Dropping solvent | | EtOAc | 20 | 20 | 0 | 0 | 20 | 0 | 0 | — | 5 | — | 20 | 10 | 20 |
| Polymerization temperature | | C. ° | 85 | 85 | 90 | 90 | 85 | 90 | 90 | 90 | 90 | 90 | 85 | 85 | 85 |
| Weight average molecular weight | | Mw | $10 \times 10^4$ | $14 \times 10^4$ | $25 \times 10^4$ | $25 \times 10^4$ | $8 \times 10^4$ | $14 \times 10^4$ | $31 \times 10^4$ | $27 \times 10^4$ | $33 \times 10^4$ | $27 \times 10^4$ | $10 \times 10^4$ | $15 \times 10^4$ | $18 \times 10^4$ |

MMA: methyl methacrylate
2-EHA: 2-ethylhexyl acrylate
AA: acrylic acid
MA: methacrylic acid

TABLE 3

| | Example 1 | Example 2 | Example 3 | Example 4 | Example 5 | Example 6 | Example 7 | Example 8 | Example 9 | Example 10 | Example 11 | Example 12 | Comparative Example 1 | Comparative Example 2 |
|---|---|---|---|---|---|---|---|---|---|---|---|---|---|---|
| Acrylic copolymer A | A-1 | A-2 | A-3 | A-4 | A-5 | A-6 | A-7 | A-8 | A-9 | A-10 | A-11 | A-3 | A-12 | A-13 |
| Adhesive force to glass [N/25 mm] | 5 | 7 | 5 | 5 | 4 | 3 | 6 | 7 | 13 | 4 | 3 | 5 | 3 | 1 |
| Adhesive deposit | A | A | A | A | B | A | A | A | A | A | A | A | C | A |
| Holding force 70° C. Holding time (min) (1 kg) | 27 | 54 | 40 | 45 | 7 | 30 | 40 | >60 | 18 | >60 | >60 | 45 | 2 | >60 |

TABLE 3-continued

| | Example 1 | Example 2 | Example 3 | Example 4 | Example 5 | Example 6 | Example 7 | Example 8 | Example 9 | Example 10 | Example 11 | Example 12 | Comparative Example 1 | Comparative Example 2 |
|---|---|---|---|---|---|---|---|---|---|---|---|---|---|---|
| Determination | S | S | S | S | A | S | S | S | S | S | S | S | C | S |
| Half width | 0.15 | 0.16 | 0.16 | 0.17 | 0.13 | 0.20 | 0.25 | 0.33 | 0.19 | 0.19 | 0.20 | 0.16 | No peak | 0.12 |
| Relative dielectric constant | 3.2 | 3.3 | 2.7 | 2.7 | 3.0 | 3.1 | 2.2 | 3.2 | 3.3 | 2.9 | 3.0 | 2.7 | 3.0 | 3.0 |

In Examples 1 to 12, good adhesive force and holding force are shown as adhesives. In particular, in Examples 1 to 4 and 6 to 12, there was no adhesive deposit, and excellent properties are shown.

Meanwhile, Comparative Example 1 uses a (meth) acrylic copolymer (A-12) which does not use macromonomer (a). In Comparative Example 1, adhesive deposit was found. In Comparative Example 2, the half width of a primary scatter peak in small-angle X-ray scattering measurement was 0.12, which is outside the scope of the invention. In both cases, adhesive force and holding force were inferior to those of Examples.

Examples 13, 14 and 17

The adhesive compositions of composition ratios given in Table 4 were cured or crosslinked after each test piece was prepared. Even in this case, these adhesive compositions had good holding force and adhesive force.

[Curing Conditions]
Apparatus: 2P curing apparatus, light source: high-pressure mercury lamp, irradiation intensity: 200 mW/cm$^2$, irradiation amount: 1000 mJ/cm$^2$ Examples 15 and 16

The adhesive compositions of composition ratios given in Table 4 were cured or crosslinked after each test piece was prepared. Even in this case, these adhesive compositions had good holding force and adhesive force.

[Curing Conditions]
100° C., 60 minutes

TABLE 4

| | | Example 13 | Example 14 | Example 15 | Example 16 | Example 17 |
|---|---|---|---|---|---|---|
| | Copolymer A (kind) | A-3 | A-3 | A-4 | A-4 | 4-3 |
| Adhesive composition (parts) | Copolymer A solution | 200 | 200 | 200 | 200 | 200 |
| | PETA | 10 | 10 | — | — | — |
| | INNA | — | — | — | — | 200 |
| | UV3000B | — | — | — | — | 10 |
| | BP | — | 0.5 | — | — | — |
| | IRG184 | 0.5 | — | — | — | 7 |
| | PIC | — | — | 0.5 | — | — |
| | Al(acac)$_3$ | — | — | — | 1.0 | — |
| Glass adhesive force [N/25 mm] | | 4 | 5 | 5 | 5 | 7 |
| Holding force 70° C. Holding time (min) (1 kg) | | >60 | >60 | >60 | >60 | >60 |

PETA: pentaerythritol triacrylate

INNA: isononyl acrylate

UV 3000 B: urethane acrylate (trade name, manufactured by Nippon Synthetic Chemical Industry Co., Ltd.)

BP: benzophenone

IRG 184: "IRGACURE 184" (trade name, manufactured by BASF Corporation)

PIC: polyisocyanate ("CORONATE L", trade name, manufactured by Tosoh Corporation)

Al(acac)$_3$: aluminum trisacetylacetonate

The invention claimed is:

1. A (meth)acrylic copolymer (A) having a weight average molecular weight of 1,000 to 1,000,000,
   wherein the (meth)acrylic copolymer (A) satisfies 0.12<X, when X is defined as a half width of a primary scatter peak in small angle X-ray scattering measurement,
   wherein the (meth)acrylic copolymer (A) comprises a constituent unit derived from a macromonomer (a) having a number average molecular weight of 500 to 100,000 and a constituent unit derived from a vinyl monomer (b),
   wherein the macromonomer (a) is represented by Formula (1):

wherein in Formula (1):
R is a hydrogen atom, an alkyl group, a cycloalkyl group, an aryl group, or a heterocyclic group, the alkyl group, cycloalkyl group, aryl group, or heterocyclic group may have a substituent;

Z is an end group; and the symbol " . . . " represents a main chain moiety comprising two or more constituent units represented by Formula (a'):

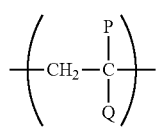

wherein in formula (a'):

P represents a hydrogen atom, a methyl group, or CH$_2$OH;

Q is selected from the group consisting of OR, O$_2$CR, halogen, CO$_2$H, COR, CO$_2$R CN, CONH$_2$, CONHR, CONR$_2$, and R';

R is selected from the group consisting of a hydrogen atom, substituted and unsubstituted alkyl, substituted and unsubstituted aryl, substituted and unsubstituted heteroaryl, substituted and unsubstituted aralkyl, substituted and unsubstituted alkaryl, and substituted and unsubstituted organosilyl; the substituents are the same as or different from each other, and are selected from the group consisting of carboxylic acid, carboxylic acid ester, epoxy, hydroxyl, alkoxy, primary amino, secondary amino, tertiary amino, isocyanato, sulfonic acid, and halogen;

R' is selected from the aromatic group consisting of substituted and unsubstituted aryl, substituted and unsubstituted heteroaryl; and the substituents are the same as or different from each other, and are selected from the group consisting of carboxylic acid, carboxylic acid ester, epoxy, hydroxyl, alkoxy, primary amino, secondary amino, tertiary amino, isocyanate, sulfonic acid, substituted and unsubstituted alkyl, substituted and unsubstituted aryl, substituted and unsubstituted olefins, and halogen.

2. The (meth)acrylic copolymer (A) according to claim 1, wherein the (meth)acrylic copolymer (A) has a relative dielectric constant of 3.5 or less at a frequency of 100 kHz.

3. The (meth)acrylic copolymer (A) according to claim 1, wherein the (meth)acrylic copolymer (A) is a polymerization product of a monomer mixture comprising the macromonomer (a) having a number average molecular weight of 500 to 100,000 and the vinyl monomer (b).

4. The (meth)acrylic copolymer (A) according to claim 1, wherein the (meth)acrylic copolymer (A) comprises a repeating unit derived from the macromonomer (a) in an amount of 7 to 40 mass %.

5. The (meth)acrylic copolymer (A) according to claim 1, wherein the macromonomer (a) has a glass transition temperature (Tga) of 0° C. to 150° C.

6. The (meth)acrylic copolymer (A) according to claim 1, wherein the macromonomer (a) comprises a monomer constituent unit having a (meth)acryloyl group in an amount of 80 mass % or more.

7. An adhesive composition, comprising the (meth)acrylic copolymer (A) according to claim 1.

8. An adhesive sheet, comprising the adhesive composition of claim 7.

9. A coating material, comprising the (meth)acrylic copolymer (A) according to claim 1.

10. A coated product, comprising the (meth)acrylic copolymer (A) according to claim 1.

* * * * *